(12) United States Patent
Fidalgo et al.

(10) Patent No.: US 6,425,526 B1
(45) Date of Patent: Jul. 30, 2002

(54) CONTACTLESS CARD COMPRISING INHIBITING MEANS

(75) Inventors: Jean-Christophe Fidalgo, Gemenos; Olivier Brunet, Marseille; Ray Freeman, Gemenos; Philippe Patrice, Allauch, all of (FR)

(73) Assignee: Gemplus (FR)

( * ) Notice: Subject to any disclaimer, the term of this patent is extended or adjusted under 35 U.S.C. 154(b) by 0 days.

(21) Appl. No.: 09/806,578

(22) PCT Filed: Sep. 22, 1999

(86) PCT No.: PCT/FR99/02246

§ 371 (c)(1),
(2), (4) Date: Sep. 6, 2001

(87) PCT Pub. No.: WO00/21029

PCT Pub. Date: Apr. 13, 2000

(30) Foreign Application Priority Data

Oct. 2, 1998 (FR) ............................................ 98 12386

(51) Int. Cl.[7] .............................................. G06K 19/06
(52) U.S. Cl. ........................................ 235/492; 235/487
(58) Field of Search ................................ 235/375, 379, 235/380, 491, 492

(56) References Cited

U.S. PATENT DOCUMENTS

| | | | | |
|---|---|---|---|---|
| 4,621,190 A | * | 11/1986 | Saito et al. ................. 235/492 |
| 5,612,532 A | * | 3/1997 | Iwasaki ....................... 235/492 |
| 5,635,702 A | * | 6/1997 | Monicault ................... 235/492 |
| 5,710,458 A | * | 1/1998 | Iwasaki ....................... 257/679 |
| 5,886,874 A | * | 3/1999 | Onoda et al. ............... 235/487 |
| 5,999,409 A | * | 12/1999 | Ando et al. ................. 361/737 |
| 6,049,461 A | * | 4/2000 | Haghiri-Tehrani et al. .. 361/737 |
| 6,166,911 A | * | 12/2000 | Usami et al. ............... 361/737 |

FOREIGN PATENT DOCUMENTS

| | | | |
|---|---|---|---|
| DE | 19530608 | 2/1997 | |
| EP | 0689163 | 12/1995 | |
| EP | 0706153 | 4/1996 | |
| EP | 0901101 | 3/1999 | |
| FR | 2772494 | 6/1999 | |
| WO | WO99/31625 | * 6/1999 | ......... G06K/19/073 |

* cited by examiner

*Primary Examiner*—Karl D. Frech
*Assistant Examiner*—Ahshik Kim
(74) *Attorney, Agent, or Firm*—Burns, Doane, Swecker & Mathis, L.L.P.

(57) ABSTRACT

A contactless smart card includes a card body, an antenna and an integrated circuit chip connected to the antenna's connecting terminals. The connecting terminals of the antenna are further connected to conductive via holes emerging at the card surface. A junction based on an electrically conductive substance is flush with the card surface and connects the conductive via holes. The electrically conductive substance is designed to be removed by scraping, and prevents the card from being used until it is removed.

4 Claims, 2 Drawing Sheets

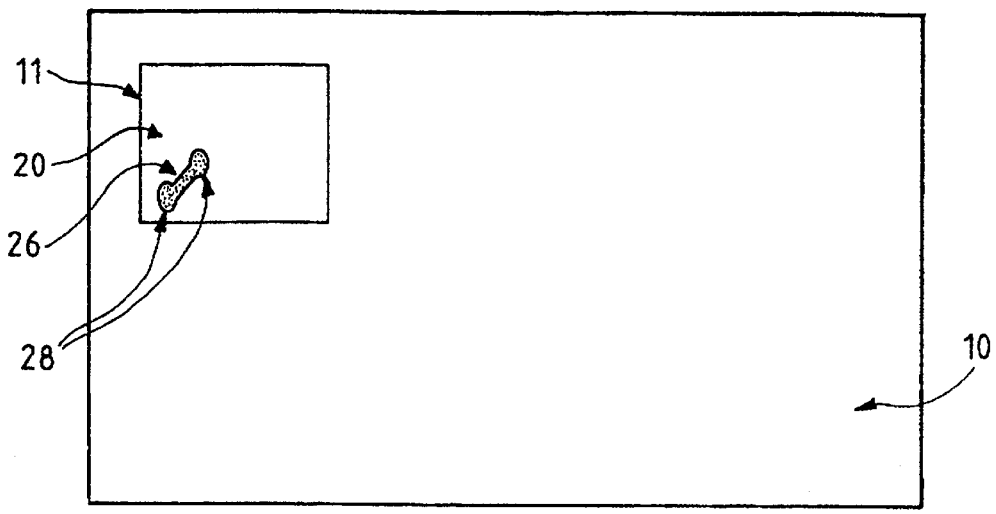
FIG_1
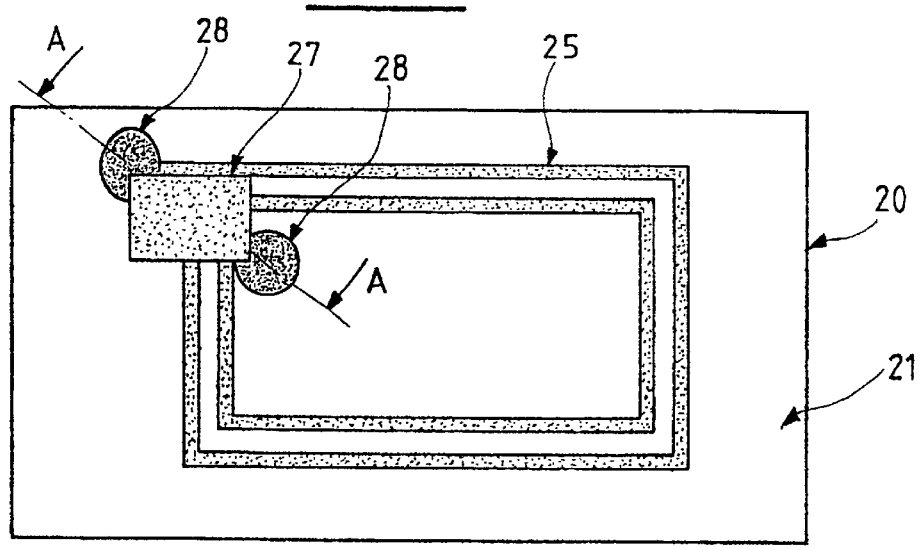
FIG_2
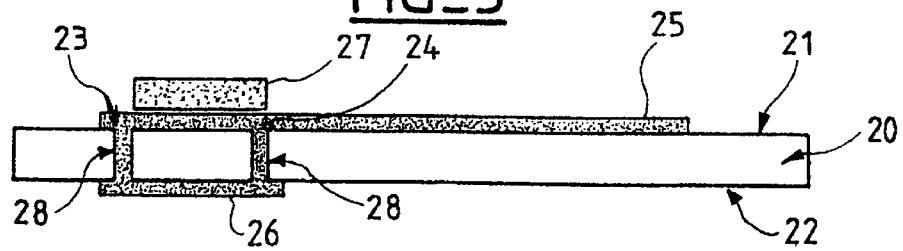
FIG_3

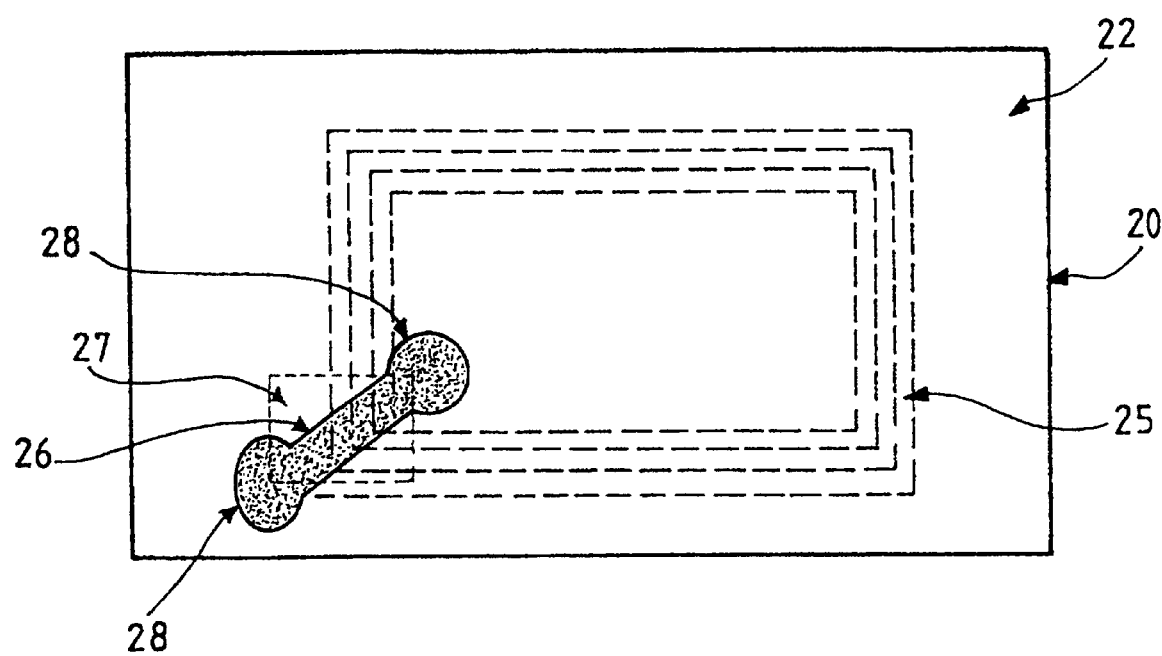
FIG_4
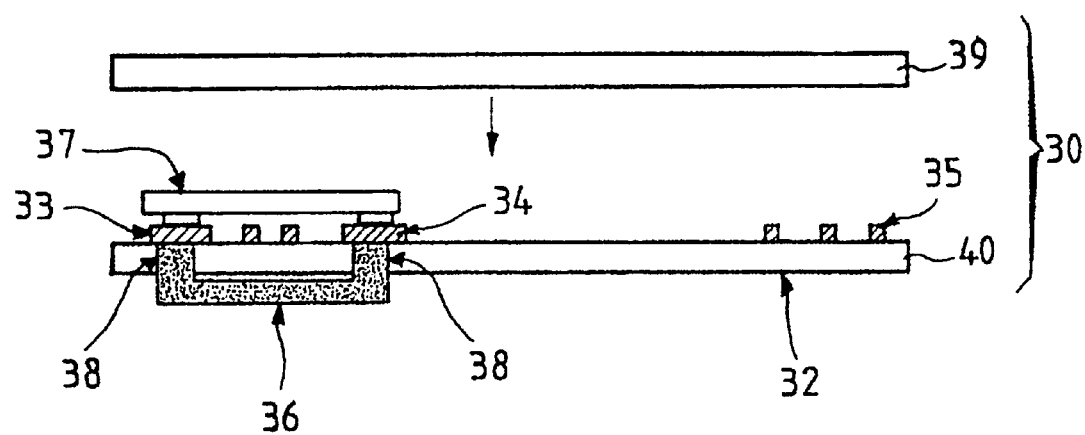
FIG_5

CONTACTLESS CARD COMPRISING INHIBITING MEANS

This disclosure is based upon, and claims priority from French Application No. 98/12386, filed on Oct. 2, 1998 and International Application No. PCT/FR99/02246, filed Sep. 22, 1999, which was published on Apr. 13, 2000 in a language other than English, the contents of which are incorporated herein by reference.

BACKGROUND OF THE INVENTION

The invention relates to a smart card or "chip card" provided with inhibiting means.

The invention relates more particularly to a contactless smart card comprising a card body, an antenna and, connected to the connection terminals of said antenna, an integrated-circuit chip. Such cards are designed to perform: various debit operations in public-transport vehicles, and in particular in subways, i.e. underground railways, buses, or trains; banking operations; telephone calls; or various identification operations. Such operations are performed by means of electromagnetic coupling between the card and receiver or reader equipment. The coupling can be implemented in read mode or in read/write mode.

In a particularly common application, such smart cards, be they provided with contacts or be they contactless, are used as means for paying for a service. Each time the corresponding service is used, at least one unit of value is decremented from the initial stock of units of value loaded in the memory of the smart card. Such applications are to be found, for example, in telephone cards and in photocopier cards. Such a smart cards thus initially contains in its memory a given number of units of value corresponding to the maximum credit.

In most applications in which the smart card is used as payment means, the card used is of the type having contacts and in which conductive tracks are connected to the integrated-circuit chip, and make it possible for the card to be electrically connected to a reader.

In which case, in order to guarantee to the user that the card purchased by him or her has the maximum number of units of value, it is necessary merely to wrap the card in a sealed jacket, e.g. in the form of cellophane wrapping, thereby preventing any electrical contact with the conductive tracks.

When the card is a contactless card, that solution is not satisfactory. The cellophane jacket cannot prevent interchange of information that takes place remotely between the card and a reader. Therefore, when the card is a contactless smart card, a sealed jacket cannot guarantee that the card has not been used previously.

SUMMARY OF THE INVENTION

An object of the invention is therefore to provide a novel smart card design in which inhibiting means are provided that make it possible to prevent any fraudulent use of the card prior to it being used for the first time by an authorized user.

To this end, the invention provides a contactless smart card comprising a card body, an antenna and, connected to the connection terminals of said antenna, an integrated-circuit chip, said smart card being characterized in that the connection terminals of the antenna are further connected to conductive through holes opening out on the surface of the card, and in that a junction based on an electrically conductive substance, and designed to be removed by being scratched off before the card is used for the first time, is disposed flush with the surface of the card, and interconnects the conductive through holes.

According to another characteristic of the invention, the card further comprises a two-faced electronics module received in a cavity provided in the card body, the antenna and the integrated-circuit chip being supported by a first face of said electronics module, the conductive through holes connected to the connection terminals of the antenna being provided through the thickness of said module, and the junction interconnecting the conductive through holes being provided on the second face of said module, said second face being flush with the surface of the card.

According to yet another characteristic of the invention, the antenna extends throughout the plane of the card body, the antenna and the integrated-circuit chip are embedded in the card body, and the conductive through holes connected to the connection terminals of the antenna are provided through the thickness of the card body so that they open out on its surface.

According to yet another characteristic of the invention, the electrically conductive substance used to form the junction is an ink based on epoxy charged with silver particles or with carbon.

BRIEF DESCRIPTION OF THE DRAWINGS

Other features and advantages of the invention will appear on reading the following description given by way of non-limiting example and with reference to the accompanying figures, in which:

FIG. 1 is a plan view of a contactless smart card in a first embodiment of the invention;

FIG. 2 is a view from beneath a two-faced electronics module used in the contactless smart card of FIG. 1;

FIG. 3 is a section view of the module of FIG. 2;

FIG. 4 is a plan view of the electronics module of FIGS. 2 and 3; and

FIG. 5 is a section view of a contactless smart card in a second embodiment of the invention, while it is being manufactured.

DETAILED DESCRIPTION

FIGS. 1 to 4 are different views of the component elements of a contactless smart card or "chip card" 10 in a first embodiment of the invention. This smart card 10 comprises a card body which is generally made of a plastics material by injection molding or by lamination, for example. It further comprises inhibiting means for preventing it from being used so long as they have not been deactivated. More particularly, the card 10 has a junction 26 flush with its surface. This junction 26 is formed of an electrically conductive substance, e.g. by screen-printing with a conductive ink, and it interconnects the terminals of an antenna (not shown in FIG. 1) via conductive through holes 28. Thus, the junction 26 flush with the surface of the card 10 makes it possible to short-circuit the terminals of the antenna. In this state, the card 10 is thus unusable. This junction thus makes it possible to detect whether the card has already been used.

When a user wishes to put the card into service, either, as soon as it has been purchased, or when it is to be used for the first time, the user therefore removes this junction 26. To remove the junction, the user merely needs to scratch it off since the electrically conductive substance used is formulated such that it adheres poorly to the substrate. The conductive substance is, for example, an ink based on epoxy charged with silver particles or with carbon.

By breaking this junction 26, it is possible to remove the short-circuit of the antenna so that remote communication between the card and a reader is made possible.

In this first embodiment, the card 10 is provided with a cavity 11 in which an electronics module 20 is inserted. The electronics module 20 is shown diagrammatically in FIGS. 2 to 4 respectively in a view from beneath it, in section, and in a plan view. It has two faces 21 and 22. A first face 21 supports an antenna 25 and an integrated-circuit chip 27 connected to the connection terminals of the antenna. This first face 21 is designed to be received in the bottom of the cavity 11 in the card body 10. FIG. 2 shows a view from beneath the module 20, i.e. a view of said first face 21 of the module 20, which face is designed to be received in the bottom of the cavity in the card body 10. FIG. 4 is a plan view of the module, i.e. a view of the second face 22 of the module 20, which face is designed to come flush with the surface of the card body 10. However, in FIG. 4, the antenna 25 and the chip 27 are shown in dashed lines.

The antenna 25 may be formed by printing with conductive ink, by using a conventional pad-printing method or offset printing method, for example. This antenna 25 is implemented conventionally in the form of a continuous conductor which is wound in a rectangular spiral made up of a certain number of turns disposed concentrically and extending in the plane of the first face 21 of the electronics module 20. The two ends of the antenna conductor 25 respectively form an external terminal 23 and an internal terminal 24, via which terminals the antenna is connected to two contact tabs of an integrated-circuit chip 27. This chip 27 is mounted on the antenna using a conventional well-known mounting technique, such as mounting of the "flip-chip" type, for example, or of some other type.

Two orifices 28 are provided through the thickness of the module 20, facing the connection terminals 23, 24 of the antenna. They are disposed so as to lead through to the second face 22 of the electronics module 20. These orifices are metal-plated using a method of screen-printing with a conductive ink, so as to obtain conductive through holes or "plated through holes" 28 that are connected electrically to the connection terminals 23, 24 of the antenna 25. This conductive ink screen-printing step also makes it possible to form the junction 26 flush with the second face 22 of the module and interconnecting the two conductive through holes 28. Thus, the conductive through holes 28 and the junction 26 may be formed simultaneously. This junction 26 makes it possible to interconnect the two terminals 23, 24 of the antenna 25 via the conductive through holes 28, thereby creating a short-circuit making the card unusable.

In the example described above, the antenna 25 is described as being a winding of a continuous conductor whose ends respectively form an internal terminal and an external terminal. In a variant embodiment, it is possible to form the antenna in some other manner. For example, it may be in the form of a winding having two external terminals or having two internal terminals. In which case, the turns of the winding overlap, and to prevent them from short-circuiting, care is taken, during manufacture of the antenna, to separate the overlapping turns with insulating patches.

Another contactless smart card, in a second embodiment of the invention, is shown diagrammatically while it is being manufactured in the section view of FIG. 5. In this second embodiment, the smart card, referenced 30, does not have a cavity or an electronics module.

In this case, the card body 30 is made up of at least two sheets of plastics material 39, 40 to the dimensions (width, length) of the card to be made. An antenna 35 is printed on a first sheet 40 by a well-known printing technique of the offset printing or pad-printing type, for example. The antenna 35 is in the form of a continuous conductor that is wound in a rectangular spiral having a certain number of turns disposed concentrically and that extends in the entire plane of the sheet 40 constituting the card body 30 The ends 33, 34 of the antenna conductor 35 form connection terminals to which two contact tabs of an integrated-circuit chip 37 are connected.

Two orifices are provided through the thickness of the card body, facing the connection terminals 33, 34 of the antenna 35, so that they open out on an external face 32 of the card body 30. These orifices are then metal plated using a printing deposition method, e.g. by screen-printing with a conductive ink, so as to form conductive through holes, i.e. plated through holes, 38. Such a screen-printing method makes it possible, in a first step, to form a junction 36 at the surface of the external face 32 of the card body, in order to interconnect the connection terminals 33, 34 of the antenna 35 via the conductive through holes 38.

An optionally transparent second sheet 39 is then mounted on the sheet 40 so as to protect the antenna 35 and the integrated-circuit chip 37, and so as to embed them in the card body 30. The second sheet 39 is mounted using a well-known conventional method, e.g. lamination.

Thus, the smart card 30 has a top face 32 that supports a junction 36 making it possible to inhibit, i.e. prevent, operation of the smart card by short-circuiting the antenna via conductive through holes 38. By means of the presence of said junction, the user knows that the card has not yet been used, and that the number of units of value in the memory is thus at its maximum.

In order to activate the card, the user merely needs to scratch off the junction 26 so as to destroy it, thereby removing the short-circuit. The conductive ink is formulated in a manner such that it adheres poorly to the surface of the card body. For example, it is based on epoxy charged with silver particles or with carbon.

What is claimed is:

1. A contactless smart card comprising a card body, an antenna, an integrated-circuit chip connected to terminals of said antenna, said terminals of the antenna being further connected to conductive through holes opening out on the surface of the card, and a junction formed by an electrically conductive substance disposed flush with the surface of the card and interconnecting the conductive through holes, said electrically conductive substance being designed to be easily removed from the card by being scratched off to thereby remove the interconnection between said through holes.

2. A card according to claim 1, further comprising a two-faced electronics module received in a cavity provided in the card body, the antenna and the integrated-circuit chip being supported by a first face of said electronics module, the conductive through holes connected to the connection terminals of the antenna being provided through the thickness of said module, and the junction interconnecting the conductive through holes being provided on the second face of said module, said second face being flush with the surface of the card.

3. A card according to claim 1, wherein said antenna extends throughout the plane of the card body, the antenna and the integrated-circuit chip being embedded in the card body, and wherein the conductive through holes connected to the connection terminals of the antenna are provided through the thickness of the card body so that they open out on its surface.

4. A card according to claim 1, wherein the electrically-conductive substance that forms the junction is an ink based on epoxy containing silver particles or carbon.

* * * * *